United States Patent
Bedouet et al.

(10) Patent No.: US 6,667,864 B2
(45) Date of Patent: *Dec. 23, 2003

(54) LOW-COST POWER SUPPLY DEVICE TO A PLURALITY OF ELECTRONIC MODULES INSTALLED IN A COMPARTMENT

(75) Inventors: Bernard Bedouet, Bourg les Valence (FR); Dominique Loise, Velizy Villacoublay (FR); Patrick Sardier, Meudon la Foret (FR)

(73) Assignee: Sextant Avionique, Velizy Villacoublay (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,063
(22) PCT Filed: Feb. 20, 1998
(86) PCT No.: PCT/FR98/00336
§ 371 (c)(1),
(2), (4) Date: Aug. 25, 1999
(87) PCT Pub. No.: WO98/38719
PCT Pub. Date: Sep. 3, 1998

(65) Prior Publication Data
US 2003/0052540 A1 Mar. 20, 2003

(30) Foreign Application Priority Data
Feb. 25, 1997 (FR) .............................. 97 02211

(51) Int. Cl.[7] ................................. H02H 7/00
(52) U.S. Cl. ............................................ 361/18; 307/28
(58) Field of Search .............................. 307/18, 19, 25, 307/28, 29, 38, 58, 71, 72, 75; 361/18, 91.1, 91.5

(56) References Cited

U.S. PATENT DOCUMENTS 4,652,769 A * 3/1987 Smith et al. ................... 307/31
5,477,091 A 12/1995 Fiorina et al. ................. 307/66

FOREIGN PATENT DOCUMENTS

DE 4009077 A 10/1991
GB 2248981 A 4/1992

OTHER PUBLICATIONS

Lee et al.: "Optimizing the design of switch–mode power supplies with battery back–up and power factor correction" IEEE, Apr. 30, 1995, pp. 2051–2054, XP000059099, p. 2052; Figure 2.

* cited by examiner

Primary Examiner—Ronald W. Leja
(74) Attorney, Agent, or Firm—Oblon, Spivak, McClelland, Maier & Neustadt, P.C.

(57) ABSTRACT

A power supply for a plurality of electronic modules in a compartment. DC electric current is provided to a plurality of consumer electronic modules on the basis of a perturbed DC voltage exhibiting a wide voltage variation range. The supply device includes a primary supply module and a voltage preregulator able to step up or step down the DC voltage in order to provide the modules with a preregulated voltage exhibiting a small voltage variation range. Each module includes a voltage conversion device for providing the voltages adapted to the needs of the module.

40 Claims, 2 Drawing Sheets

LOW-COST POWER SUPPLY DEVICE TO A PLURALITY OF ELECTRONIC MODULES INSTALLED IN A COMPARTMENT

BACKGROUND OF THE INVENTION

1. Field of the Invention

The present invention relates to a device for supplying electric current to a plurality of modules clustered in an electronic rack.

2. Discussion of the Background

It applies in particular, but not exclusively, to the electronic equipment carried on board aerodynes which are supplied from a DC electric current distribution network. It turns out that the DC voltage provided by this network is greatly perturbed, this being prejudicial in respect of the electronic equipment which might be supplied via such a voltage.

These perturbations originate firstly from the fact that the energy sources which supply this network are not unique. Indeed, when the engines of the aerodyne are stopped, the network is supplied from batteries, but when the engines are running, the network is supplied from electrical generators coupled to the engines. Moreover, an aerodyne in flight may be subject to strong electromagnetic perturbations, and in particular lightning, and this may give rise to considerable overvoltages in the electrical network or conversely brown-outs.

Likewise, the variations in the load on this network and in the consumption by the equipment supplied therefrom, as well as the regulating transients of the generators, give rise to considerable momentary variations in voltage. Thus, for a nominal voltage of 28 volts, voltage variations possibly reaching 12 to 48 volts have been noted. Moreover, the overvoltages engendered by lightning may be much more considerable.

It is therefore necessary to provide a voltage regulating device in regard to each item of equipment carried, capable of withstanding and dealing with such voltage variations.

Moreover, equipment carried on board aerodynes is evolving towards an evermore modular and evermore integrated architecture comprising racks or cabinets in which are clustered a multiplicity of modules having needs in terms of supply voltage which vary from one module to another.

Each module has therefore been furnished with a supply device comprising all the necessary DC voltage conversion and regulating means. Now, the components allowing the regulating of such voltage variations are relatively voluminous and costly. It follows that, applied to a multiplicity of modules, this approach is costly and leads to the size of each module being considerably increased, and to its reliability being reduced since the module must then withstand large voltage variations.

SUMMARY OF THE INVENTION

The purpose of the present invention is to overcome these drawbacks. To this end, it proposes a supply device for supplying DC electric current to a plurality of consumer electronic modules, on the basis of a DC voltage exhibiting a wide voltage variation range, this device comprising voltage regulating means and voltage conversion means.

According to the invention, this device is characterized in that it comprises a primary supply module comprising voltage preregulating means able to step up or step down the voltage in order to provide the modules with a preregulated voltage exhibiting a small voltage variation range and, in regard to each module, voltage conversion means providing voltages adapted to the needs of the module.

By virtue of these arrangements, the costly and bulky power regulating components are clustered in a single module, while the converters integrated into each consumer module are inexpensive and compact, given that they are required to deal only with a voltage subject to small variations.

Thus, for example, when the voltage to be regulated varies between 12 and 48 volts around a nominal voltage of 28 volts, the primary supply module according to the invention makes it possible to obtain, as output, a preregulated voltage which varies at most between 18 and 32 volts. Such a range of variation is perfectly acceptable to cheap DC voltage converters available on the market.

Moreover, the wiring necessary to supply each consumer module from the supply module comprises just two electrical leads, each module remaining autonomous as regards the production of the voltages which it needs. Thus, this avoids the requirement to provide specific wiring to convey each necessary voltage between a common supply module and the consumer modules.

This solution therefore makes it possible to simplify the wiring, and thus to reduce the costs considerably.

Advantageously, the means of voltage conversion in regard to each module comprise galvanic isolation means making it possible to circumvent the perturbations which could occur on the preregulated current distribution line between the primary supply module and the consumer modules.

According to one particular feature of the invention, each consumer module is supplied by means of one respective line per primary supply module which comprises, at each supply line feed, automatic outage means for protection against short-circuits.

This arrangement makes it possible to obtain great security of operation, each module being supplied via an independent line and being able to be powered-up selectively by the primary supply module should there be a short-circuit in regard to the module of the supply line.

BRIEF DESCRIPTION OF THE DRAWINGS

An embodiment of the device according to the invention will be described below, by way of non-limiting example, with reference to the appended drawings in which.

DETAILED DESCRIPTION OF THE PREFERRED EMBODIMENT

Figure 1:
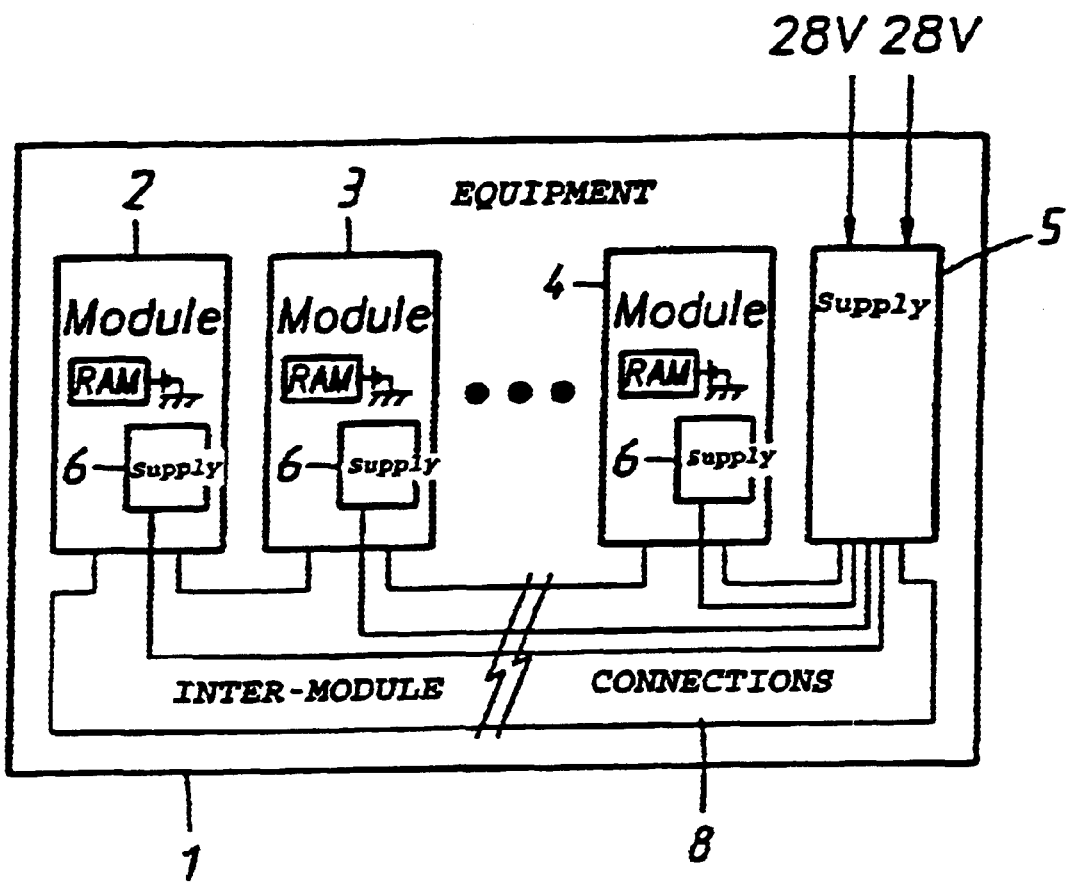
FIG. 1 diagrammatically represents an item of electronic equipment carried on board an aerodyne, clustering together several consumer modules and a primary supply module according to the invention.

The electronic equipment 1 represented in FIG. 1 takes the form of a rack or a shelf into which are inserted and interconnected, by means of so-called "backplane" links 8, a plurality of modules 2 to 5, including a primary supply module 5 according to the invention, which groups together the functions of preregulating the primary voltages to 28 volts provided by the general supply to the aerodyne.

Generally, an aerodyne comprises at least two DC electric current distribution networks, namely a main network and a backup network. The primary supply module is then connected to these two networks as shown by the figure.

More precisely, the primary supply module 5 caters for the functions of overvoltage limitation, of clipping of transient voltages due to lightning and of compensation for fleeting voltage drops, for the purpose of delivering a voltage preregulated to 28 volts to the other modules 2 to 4. Indeed, it turns out that the voltages provided by the general supplies of an aerodyne are subject to large variations, from 12 to 48 volts, these variations possibly being much greater when transient.

The primary supply module 5 groups together on a single electronic card a set of relatively bulky and costly components so as to provide several modules with a preregulated voltage exhibiting a small range of variations, for example from 18 to 32 volts, which may then be adapted by cheap voltage converters 6 integrated into each module and capable of providing the varied voltages used by them.

Figure 2:
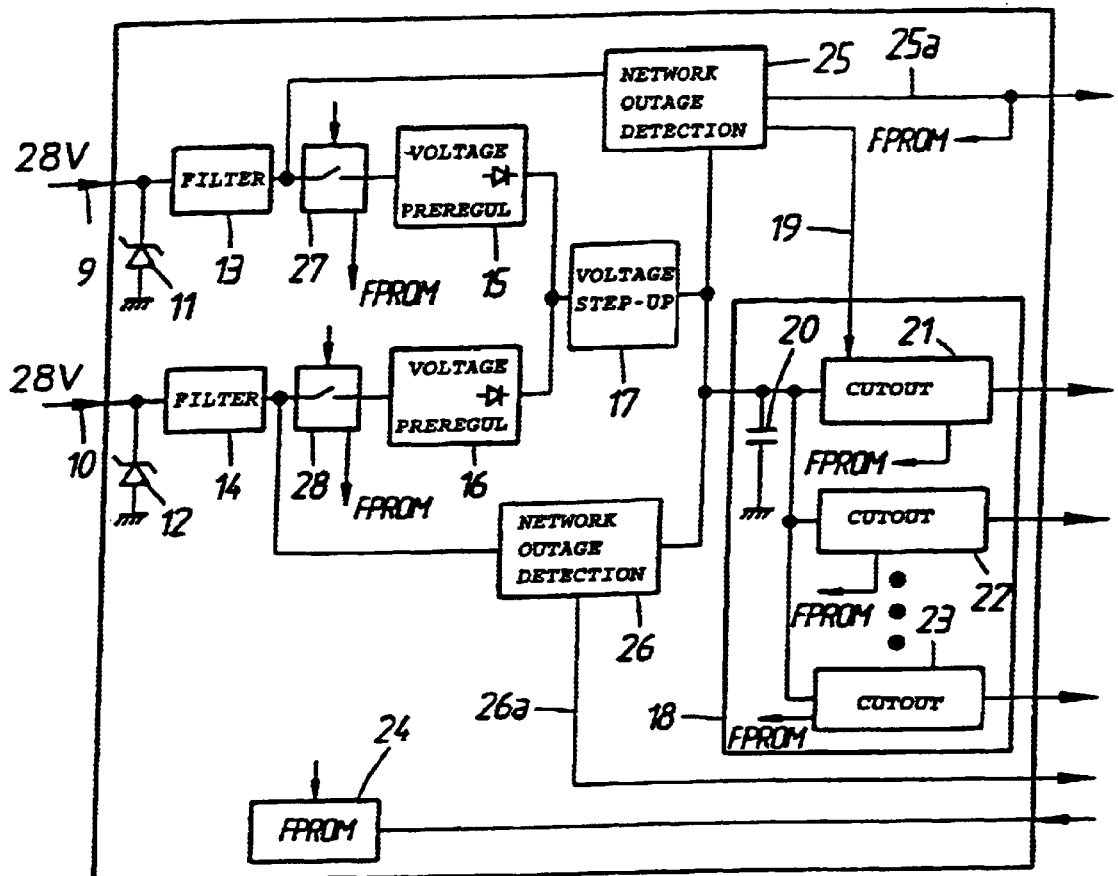
FIG. 2 shows the primary supply module according to the invention.

In FIG. 2, the primary supply module 5 comprises successively in series, for each of the aerodyne's 28-volt supply lines applied as input:

- a clipping device 11, 12, consisting of a Zener diode and/or a similar device such as a varistor, connected in parallel between the respective supply line and earth, this device making it possible to eliminate pulses greater than 80 volts, due for example to lightning,
- a low-pass filter circuit 13, 14 linked to the output of the clipping device 11, 12,
- automatic switching means 27, 28 for supplying or not supplying the remainder of the circuit depending on the presence or absence of voltage applied as input, these means being configured in such a way as to give preference to one of the two supply networks 9, 10 of the aerodyne, when both the latter are available, and
- a voltage preregulating circuit 15, 16 for clipping the voltage and for limiting the current output by the filter circuit 13, 14.

The primary supply module 5 furthermore comprises a voltage step-up/regulator circuit 17 connected to the two voltage preregulating circuits 15, 16 so as to apply a voltage of 28 volts to the remainder of the circuit for a few tens of seconds, for example 30 seconds, when the input voltage has fallen to 12 volts minimum, and a current distribution circuit 18 connected to the output of the voltage step-up circuit 17. The distribution circuit 18 comprises an energy reserve 20 consisting for example of a bank of capacitors, and a set of electronic cutouts 21 to 23 which respectively provide the other modules 2 to 4 of the rack 1 with a preregulated 28-volt DC voltage.

It should be noted that the energy reserve 20 is located at the output of the voltage step-up/regulator circuit 17 which therefore applies a stepped-up and almost constant voltage thereto. Since the charge of a capacitor is proportional to the voltage applied across its terminals, the energy stored in the energy reserve 20 therefore remains almost constant and high irrespective of the level of the voltage provided by the network.

By virtue of these arrangements, the primary supply module 5 is capable of compensating for cutouts of a few tens of milliseconds (20 to 200 ms for example) by maintaining the supplies to the modules 2 to 4.

The cutouts 21 to 23 are designed in such a way as to open automatically in case of a downstream short-circuit, and to reclose automatically when they are subjected to voltage. They thus ensure separate protection of the primary supply module 5 against the short-circuits which may occur in regard to the modules 2 to 4 or in the connections between the modules and the cutouts, and hence guarantee the availability of the supply and the non-propagation of failures, in case of a short-circuit in a module.

The preregulating circuits 15, 16 each comprise a blocking diode preventing the capacitors 20 from discharging to the networks 9, 10, in the case of circuit outage.

Moreover, the module 5 furthermore comprises two network outage detection devices 25, 26 respectively connected in parallel between the output of the filters 13, 14 and the output of the voltage step-up circuit 17. When the duration of outage of the networks exceeds the time of cover by the energy reserve 20, the network outage detection devices 25, 26 indicate to the modules 2 to 4, with the aid of the signals 25a and 26a, that there will be a total loss of supply within a short interval of a few milliseconds (2 to 20 ms). The appearance of the signals 25a and 26a triggers a process whereby certain critical flight parameters computed in particular by the modules 2 to 4 are stored in memory with battery or capacitor backup. The memory write time is of the order of 2 to 20 ms, whilst the necessary storage time for these parameters is in general between 200 ms and 5 s.

Certain electronic cutouts 21 to 23 may also be opened with the aid of a signal 19 emanating from the main network 9 detector 25 upon the loss of this network and when it is not desired to supply one or more modules 2 to 4 with the backup network, so as to avoid too considerable a load thereon.

The module 5 also comprises a non-volatile maintenance memory 24, of FPROM type for example, making it possible to store all the events liable to facilitate the maintenance of the module, such as for example the opening of a cutout 21 to 23 and the network cutouts which have given rise to changes of state of the switches 27, 28. The contents of this memory 24 are updated by the consumer modules 2 to 4 which have write and read access thereto so as to verify each write. This memory can also be updated by the outage detectors 25, 26, and by the cutouts 21 to 23 and the switching devices 27, 28, which have, to this end, a binary output giving the state of the cutout or of the switching device, respectively.

This primary supply module 5 provides the other modules 2, 4 of the item of equipment 1 with a preregulated voltage which can then be adapted by the other modules by means of integrated secondary supply blocks 6 having a much simpler and less bulky structure which is consequently less costly than if the voltages provided by each network of the aerodyne had had to be adapted to the needs of each module.

Figure 3:
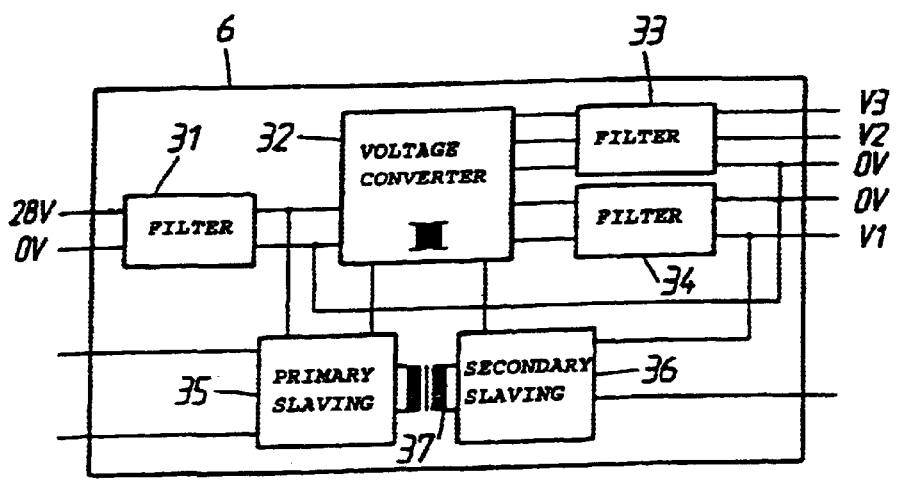
FIG. 3 shows a secondary supply module according to the invention, with which each consumer module is equipped.

Thus, in FIG. 3, each secondary supply block 6 comprises an input filter 31 receiving the preregulated voltage of 28 volts, making it possible to eliminate the high frequencies which may appear in regard to the connection lines between the cutouts 21 to 23 and the supply blocks 6. The output of the input filter 31 is connected to a DC voltage converter 32 comprising a primary block and a secondary block which are isolated galvanically by a pulse transformer. The supply to the modules is thus isolated galvanically from the primary supply module 5. The converter 32 is for example of the 0-volts-switched "flyback" chopper type. The secondary block makes it possible to provide the various voltages V1, V2, V3, necessary for the module, for example 5 V and +/−15 V, which are pre-filtered by output filters 33, 34 making it possible to eliminate any high frequencies which might be introduced by the chopper-type converter 32.

Moreover, the converter 32 is voltage-slaved by a control circuit comprising a primary circuit 35 receiving control signals, and a secondary circuit 36, which are isolated from one another, providing monitoring signals, these two circuits 35, 36 being galvanically isolated by a pulse transformer 37. The secondary control circuit 36 measures one of the voltages at the output of the filters 33, 34, for example the voltage V1, so as to generate a control signal which is transmitted to the primary circuit 35. The primary circuit 35 converts this signal on the basis of a maximum preset output power, into a second control signal which is applied to the switching transistors of the chopped converter 32. Regulation of the other output voltages V2, V3, is obtained by virtue of the magnetic coupling produced by the transformer of the converter 32 and by virtue of the symmetry of the latter's circuits. Such a converter does not require any minimum load on its outputs.

What is claimed is:

1. Supply device for supplying a preregulated voltage to a plurality of consumer electronic modules, based on a perturbed DC electrical voltage, exhibiting a wide voltage variation range, the supply device comprising:
   a primary supply module providing the electronic consumer modules with the preregulated voltage; and
   each electronic consumer module including voltage conversion means outputting electrical voltages adapted to needs of the module;
   wherein said primary supply module is linked by respective individual supply lines to each electronic consumer module and, said primary supply module comprises:
   clipping means for eliminating high voltage pulses;
   filtering means for eliminating high frequencies;
   preregulating means for limiting and clipping overvoltages;
   voltage step-up means for supplying a voltage when an input voltage drops below a predetermined level; and
   means for protection against short-circuits placed at a feed of each of the individual supply lines of the electronic consumer modules;
   each electronic consumer module not including each of clipping means, preregulating means, voltage step-up means, and means for protection against short-circuits.

2. Device according to claim 1, wherein each means for protection against short-circuits includes an assembly of a fuse support comprising at least one of a fuseholder, a fuse carrier, and a disconnecting blade.

3. Device according to claim 2, wherein the assembly opens automatically responsive to a downstream short-circuit and recloses automatically responsive to a voltage.

4. Device according to claim 3, wherein the supply module is connected to two electrical supply networks, and wherein:
   the clipping means comprises two clipping devices connected respectively to the two networks;
   the filtering means comprises two filter circuits connected respectively to the two networks;
   two automatic switching devices are connected respectively at the output of the two filter circuits;
   the preregulating means comprises two preregulating circuits connected respectively to the two switching devices;
   the voltage step-up means is connected to the two preregulating circuits; and
   further comprising:
      a distribution circuit configured to distribute electrical energy to the electronic consumer modules by individual supply lines comprising an energy reserve and a set of assemblies of a fuse support placed at the feed of each individual supply line.

5. Device according to claim 3, wherein the voltage conversion means of the electronic consumer modules comprise a chopped DC voltage converter providing one or more DC voltages.

6. Device according to claim 2, wherein the supply module is connected to two electrical supply networks, and wherein:
   the clipping means comprises two clipping devices connected respectively to the two networks;
   the filtering means comprises two filter circuits connected respectively to the two networks;
   two automatic switching devices are connected respectively at the output of the two filter circuits;
   the preregulating means comprises two preregulating circuits connected respectively to the two switching devices;
   the voltage step-up means is connected to the two preregulating circuits; and
   further comprising:
      a distribution circuit configured to distribute electrical energy to the electronic consumer modules by individual supply lines comprising an energy reserve and a set of assemblies of a fuse support is placed at the feed of each individual supply line.

7. Device according to claim 2, wherein the voltage conversion means of the electronic consumer modules comprise a chopped DC voltage converter providing one or more DC voltages.

8. Device according to claim 1, wherein the primary supply module further comprises an energy reserve of capacitor type placed at the output of the voltage step-up means for alleviating voltage drops of short duration.

9. Device according to claim 8, wherein the energy reserve coupled to the voltage step-up means is configured to compensate for short-duration cutouts, while the consumer modules comprise an energy reserve of lower power but longer duration.

10. Device according to claim 9, wherein the supply module is connected to two electrical supply networks, and wherein:
    the clipping means comprises two clipping devices connected respectively to the two networks;
    two automatic switching devices are connected respectively at the output of the two filter circuits;
    the preregulating means comprises two preregulating circuits connected respectively to the two switching devices;
    the voltage step-up means is connected to the two preregulating circuits; and
    further comprising:
       a distribution circuit configured to distribute electrical energy to the electronic consumer modules by individual supply lines comprising an energy reserve and a set of assemblies of a fuse support placed at the feed of each individual supply line.

11. Device according to claim 9, the voltage conversion means of the electronic consumer modules comprise a chopped DC voltage converter providing one or more voltages.

12. Device according to claim 8, wherein the supply module is connected to two electrical supply networks, and wherein:
    the clipping means comprises two clipping devices connected respectively to the two networks;
    the filtering means comprises two filter circuits connected respectively to the two networks;

two automatic switching devices are connected respectively at the output of the two filter circuits;

the preregulating means comprises two preregulating circuits connected respectively to the two switching devices;

the voltages step-up means is connected to the two preregulating circuits; and further comprising:

a distribution circuit configured to distribute electrical energy to the electronic consumer modules by individual supply lines comprising an energy reserve and a set of assemblies of a fuse support is placed at the feed of each individual supply line.

13. Device according to claim 8, wherein the voltage conversion means of the electronic consumer modules comprise a chopped DC voltage converter providing one or more DC voltages.

14. Device according to claim 1, wherein the supply module is connected to two electrical supply networks, and wherein:

the clipping means comprises two clipping devices connected respectively to the two networks;

the filtering means comprises two filter circuits connected respectively to the two networks;

two automatic switching devices are connected respectively at an output of the two filter circuits;

the preregulating means comprises two preregulating circuits connected respectively to the two switching devices;

the voltage step-up means is connected to the two preregulating circuits; and further comprising:

a distribution circuit configured to distribute electrical energy to the electronic consumer modules by individual supply lines comprising an energy reserve and a set of assemblies of a fuse support placed at the feed of each individual supply line.

15. Device according to claim 14, wherein the voltage conversion means of the electronic consumer modules comprise a chopped DC voltage converter providing one or more DC voltages.

16. Device according to claim 1, wherein the voltage conversion means of the consumer modules comprises a chopped DC voltage converter providing one or more DC voltages.

17. Device according to claim 1, wherein the electrical voltage output of each of the voltage conversion means is slaved by a slaving circuit comprising a primary block and a secondary block that are galvanically isolated.

18. Device according to claim 1, wherein the voltage conversion means of the electronic consumer modules comprises galvanic isolation mans for isolating each electronic consumer module from its supply line.

19. Device according to claim 1, wherein the primary supply module further comprises a non-volatile memory in which all events liable to facilitate maintenance of the module are stored.

20. Device according to claim 19, wherein the memory is controlled in read mode and in write mode by the electronic consumer modules, and in write-only mode by detectors, by assemblies of a fuse support and by switching devices.

21. Supply device for supplying a preregulated voltage to a plurality of consumer electronic modules, based on a perturbed DC electrical voltage, exhibiting a wide voltage variation range, the supply device comprising:

a primary supply module providing the electronic consumer modules with the preregulated voltage; and each electronic consumer module including a voltage convertor configured to output electrical voltages adapted to needs of the module;

wherein said primary supply module is linked by respective individual supply lines to each electronic consumer module and, said primary supply module comprises:

a clipping mechanism configured to eliminate high voltage pulses;

a high frequency filter configured to eliminate high frequencies;

a voltage preregulator configured to limit and clip overvoltages;

a voltage step-up circuit configured to supply a voltage when an input voltage drops below a predetermined level; and cutout circuitry for protection against short-circuits placed at a feed of each of the individual supply lines of the electronic consumer module;

each electronic consumer module not including each of a clipping mechanism, a voltage preregulator, a voltage step-up circuit, and cutout circuitry for protection against short-circuits.

22. Device according to claim 21, wherein each cutout circuitry includes an assembly of a fuse support comprising at least one of a fuseholder, a fuse carrier, and a disconnecting blade.

23. Device according to claim 22, wherein the assembly opens automatically responsive to a downstream short-circuit and recloses automatically responsive to a voltage.

24. Device according to claim 23, wherein the supply module is connected to two electrical supply networks, and wherein:

the clipping means comprises two clipping devices connected respectively to the two networks;

the high frequency filter comprises two filter circuits connected respectively to the two networks;

two automatic switching devices are connected respectively at the output of the two filter circuits;

the voltage preregulator comprises two preregulating circuits connected respectively to the two switching devices;

the voltage step-up circuit is connected to the two preregulating circuits; and further comprising:

a distribution circuit configured to distribute electrical energy to the electronic consumer modules by individual supply lines comprising an energy reserve and a set of assemblies of a fuse support placed at the feed of each individual supply line.

25. Device according to claim 23, wherein the voltage convertors of the electronic consumer modules comprise a chopped DC voltage converter providing one or more DC voltages.

26. Device according to claim 22, wherein the supply module is connected to two electrical supply networks, and wherein:

the clipping mechanism comprises two clipping devices connected respectively to the two networks;

the high frequency filter comprises two filter circuits connected respectively to the two networks;

two automatic switching devices are connected respectively at the output of the two filter circuits;

the voltage preregulator comprises two preregulating circuits connected respectively to the two switching devices;

the voltage step-up circuit is connected to the two pre-regulating circuits; and further comprising:
a distribution circuit configured to distribute electrical energy to the electronic consumer modules by individual supply lines comprising an energy reserve and a set of assemblies of a fuse support is placed at the feed of each individual supply line.

27. Device according to claim 22, wherein the voltage convertors of the electronic consumer modules comprise a chopped DC voltage converter providing one or more DC voltages.

28. Device according to claim 21, wherein the primary supply module further comprises an energy reserve of capacitor type placed at the output of the voltage step-up circuit for alleviating voltage drops of short duration.

29. Device according to claim 28, wherein the energy reserve coupled to the voltage step-up circuit is configured to compensate for short-duration cutouts, while the consumer modules comprise an energy reserve of lower power but longer duration.

30. Device according to claim 29, wherein the supply module is connected to two electrical supply networks, and wherein:
the clipping mechanism comprises two clipping devices connected respectively to the two networks;
two automatic switching devices are connected respectively at the output of the two filter circuits;
the voltage preregulator comprises two preregulating circuits connected respectively to the two switching devices;
the voltage step-up circuit is connected to the two pre-regulating circuits; and further comprising:
a distribution circuit configured to distribute electrical energy to the electronic consumer modules by individual supply lines comprising an energy reserve and a set of assemblies of a fuse support placed at the feed of each individual supply line.

31. Device according to claim 29, wherein the voltage convertors of the electronic consumer modules comprise a chopped DC voltage converter providing one or more DC voltages.

32. Device according to claim 28, wherein the supply module is connected to two electrical supply networks, and wherein:
the clipping mechanism comprises two clipping devices connected respectively to the two networks;
the high frequency filter comprises two filter circuits connected respectively to the two networks;
two automatic switching devices are connected respectively at the output of the two filter circuits;
the voltage preregulator comprises two preregulating circuits connected respectively to the two switching devices;
the voltage step-up circuit is connected to the two pre-regulating circuits; and further comprising:
a distribution circuit configured to distribute electrical energy to the electronic consumer modules by individual supply lines comprising an energy reserve and a set of assemblies of a fuse support is placed at the feed of each individual supply line.

33. Device according to claim 28, wherein the voltage convertors of the electronic consumer modules comprise a chopped DC voltage converter providing one or more DC voltages.

34. Device according to claim 21, wherein the supply module is connected to two electrical supply networks, and wherein:
the clipping mechanism comprises two clipping devices connected respectively to the two networks;
the high frequency filter comprises two filter circuits connected respectively to the two networks;
two automatic switching devices are connected respectively at an output of the two filter circuits;
the voltage preregulator comprises two preregulating circuits connected respectively to the two switching devices;
the voltage step-up circuit is connected to the two pre-regulating circuits; and further comprising:
a distribution circuit configured to distribute electrical energy to the electronic consumer modules by individual supply lines comprising an energy reserve and a set of assemblies of a fuse support placed at the feed of each individual supply line.

35. Device according to claim 34, the voltage convertors of the electronic consumer modules comprise a chopped DC voltage converter providing one or more DC voltages.

36. Device according to claim 21, wherein the voltage convertor of the consumer modules comprises a chopped DC voltage converter providing one or more DC voltages.

37. Device according to claim 21, wherein the electrical voltage output of each of the voltage convertor is slaved by a slaving circuit comprising a primary block and a secondary block that are galvanically isolated.

38. Device according to claim 21, wherein the voltage convertor of the electronic consumer modules comprises a galvanic isolation configured to isolate each electronic consumer module from its supply line.

39. Device according to claim 21, wherein the primary supply module further comprises a non-volatile memory in which all events liable to facilitate maintenance of the module are stored.

40. Device according to claim 39, wherein the memory is controlled in read mode and in write mode by the electronic consumer modules, and in write-only mode by detectors, by assemblies of a fuse support and by switching devices.

* * * * *